United States Patent
Ji et al.

(10) Patent No.: US 10,089,338 B2
(45) Date of Patent: Oct. 2, 2018

(54) METHOD AND APPARATUS FOR OBJECT STORAGE

(71) Applicant: International Business Machines Corporation, Armonk, NY (US)

(72) Inventors: Hai Ji, Beijing (CN); Yuan Yuan Li, Beijing (CN); Xiao Yang Yang, Beijing (CN); Chun Guang Zheng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 372 days.

(21) Appl. No.: 14/941,932

(22) Filed: Nov. 16, 2015

(65) Prior Publication Data

US 2016/0171025 A1 Jun. 16, 2016

(30) Foreign Application Priority Data

Dec. 12, 2014 (CN) .......................... 2014 1 0772951

(51) Int. Cl.
 *G06F 17/30* (2006.01)
(52) U.S. Cl.
 CPC .. *G06F 17/30312* (2013.01); *G06F 17/30365* (2013.01); *G06F 17/30607* (2013.01)
(58) Field of Classification Search
 USPC ................................................ 707/705, 747
 See application file for complete search history.

(56) References Cited

U.S. PATENT DOCUMENTS

| 5,873,097 A | 2/1999 | Harris et al. |
| 6,587,939 B1 * | 7/2003 | Takano ................. G06F 9/3017 707/999.101 |
| 6,732,124 B1 | 5/2004 | Koseki et al. |
| 6,779,202 B1 * | 8/2004 | Alldredge .............. A47K 11/10 4/255.02 |

(Continued)

FOREIGN PATENT DOCUMENTS

CN 103516549 A 1/2014

OTHER PUBLICATIONS

Anonymous: Amazon Webservices, "Amazon Simple Storage Service: Developer Guide", API Version Mar. 1, 2006, 2015, pp. 1-630.

(Continued)

*Primary Examiner* — Kim Nguyen
(74) *Attorney, Agent, or Firm* — Cantor Colburn LLP

(57) ABSTRACT

A method and an apparatus for object storage are disclosed. The method includes, in response to an update to metadata of an object in an object storage region to produce updated metadata of the object, recording a metadata object associated with the object in a metadata change storage region separated from the object storage region. The metadata object includes the updated metadata of the object and pointer information. The pointer information points to a first storage location representing a storage location of the object in the object storage region. The method also includes modifying index information associated with the object to produce modified index information. The modified index information indicates the update to the metadata and a second storage location representing a storage location of the metadata object in the metadata change storage region.

14 Claims, 7 Drawing Sheets

(56) References Cited

U.S. PATENT DOCUMENTS

| | | | |
|---|---|---|---|
| 8,131,691 B1* | 3/2012 | Nagaralu | G06F 17/30091 |
| | | | 707/696 |
| 8,223,653 B2* | 7/2012 | Wild, III | G06F 9/44505 |
| | | | 370/241 |
| 8,244,700 B2 | 8/2012 | Permandla et al. | |
| 8,589,347 B2* | 11/2013 | Erofeev | H04L 29/0854 |
| | | | 707/634 |
| 8,725,737 B2 | 5/2014 | Prahlad et al. | |
| 2006/0240761 A1* | 10/2006 | Yamaguchi | A47F 3/001 |
| | | | 454/184 |
| 2007/0108240 A1* | 5/2007 | Berger | A41D 15/00 |
| | | | 224/153 |
| 2009/0306738 A1* | 12/2009 | Weiss | A61N 1/3605 |
| | | | 607/30 |
| 2011/0142288 A1* | 6/2011 | Diamant | G06T 7/0016 |
| | | | 382/107 |
| 2012/0143824 A1 | 6/2012 | Doshi et al. | |
| 2014/0136483 A1 | 5/2014 | Chaudhary et al. | |
| 2017/0068599 A1* | 3/2017 | Chiu | G06F 11/1407 |

OTHER PUBLICATIONS

Gregory R. Ganger, et al.: "Soft Updates: A Solution to the Metadata Update Problem in File Systems"; ACM Transactions on Computer Systems, vol. 18, No. 2; May 2000; pp. 127-153.

Scott A. Brandt, et al.; "Efficient Metadata Management in Large Districbuted Storage Systems"; 11th NASA Goddard Conferencce on Mass Storage Systems and Technoologies; Sandiego, CA; Apr. 2003; pp. 9.

* cited by examiner

METHOD AND APPARATUS FOR OBJECT STORAGE

FOREIGN PRIORITY

This application claims priority to Chinese Application No. 201410772951.0 filed on Dec. 12, 2014 and all the benefits accruing therefrom under 35 U.S.C. § 119, the contents of which in its entirety are herein incorporated by reference.

BACKGROUND

Embodiments described herein relate to object storage technology, and more specifically, to methods and an apparatuses for object storage.

Object storage technology is a storage technology for both private clouds and public cloud service providers, and provides redundant, scalable data storage capable of storing petabytes of data using clusters of standardized servers.

In general, an object storage system takes an object as a basic unit of storage, and each object is an integration of data and data property set. When an object is created, metadata is used to identify data properties like name, creation time, owner, creator, size or other user-defined properties. Further, objects are stored in the object storage device. The object storage device can manage the objects stored thereon and metadata associated with these objects.

In the object storage device, a file system can be used as an underlying persistency layer. In such an object storage device, a large number of objects with small size can be usually processed in two ways, to optimize performance of the object storage.

One way is to use a log structured store data file. Such a file itself has a relatively large size, in which a plurality of objects with small size can be stored. Whenever a new object is created, the new object will be appended to the last object of the file, to implement sequential I/O operation for object access, so as to improve I/O efficiency.

The other way is to use an optimized in-memory index, which has a very small memory footprint (approximately 10 bytes per object), and can reduce a relatively large memory footprint (about several hundreds of bytes to 1K bytes per object) generated from metadata storage using inode.

In the log structured store data file, in general, the data (which may also be referred to as content) of the object together with the metadata of the object are stored as a whole. The new object can only be appended to the log structured store data file, so when the object in the file is updated, an update operation usually includes appending the new object to the last object in the log structured store data and deleting the original object. Such update operation does not destroy the sequential I/O operation. However, such update operation does not distinguish metadata update from content update. Therefore, even in the case where only the metadata of the object is updated and the content is not updated, it is still necessary to copy the original content of the object and set new metadata. Typically, the metadata has a size much smaller than that of the content, and therefore, when such update operation is used, copy of the content of the unchanged object cause a wasting of I/O operation and disk space resources.

SUMMARY

A method and an apparatus for object storage are disclosed. The method includes, in response to an update to metadata of an object in an object storage region to produce updated metadata of the object, recording a metadata object associated with the object in a metadata change storage region separated from the object storage region. The metadata object includes the updated metadata of the object and pointer information. The pointer information points to a first storage location representing a storage location of the object in the object storage region. The method also includes modifying index information associated with the object to produce modified index information. The modified index information indicates the update to the metadata and a second storage location representing a storage location of the metadata object in the metadata change storage region.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
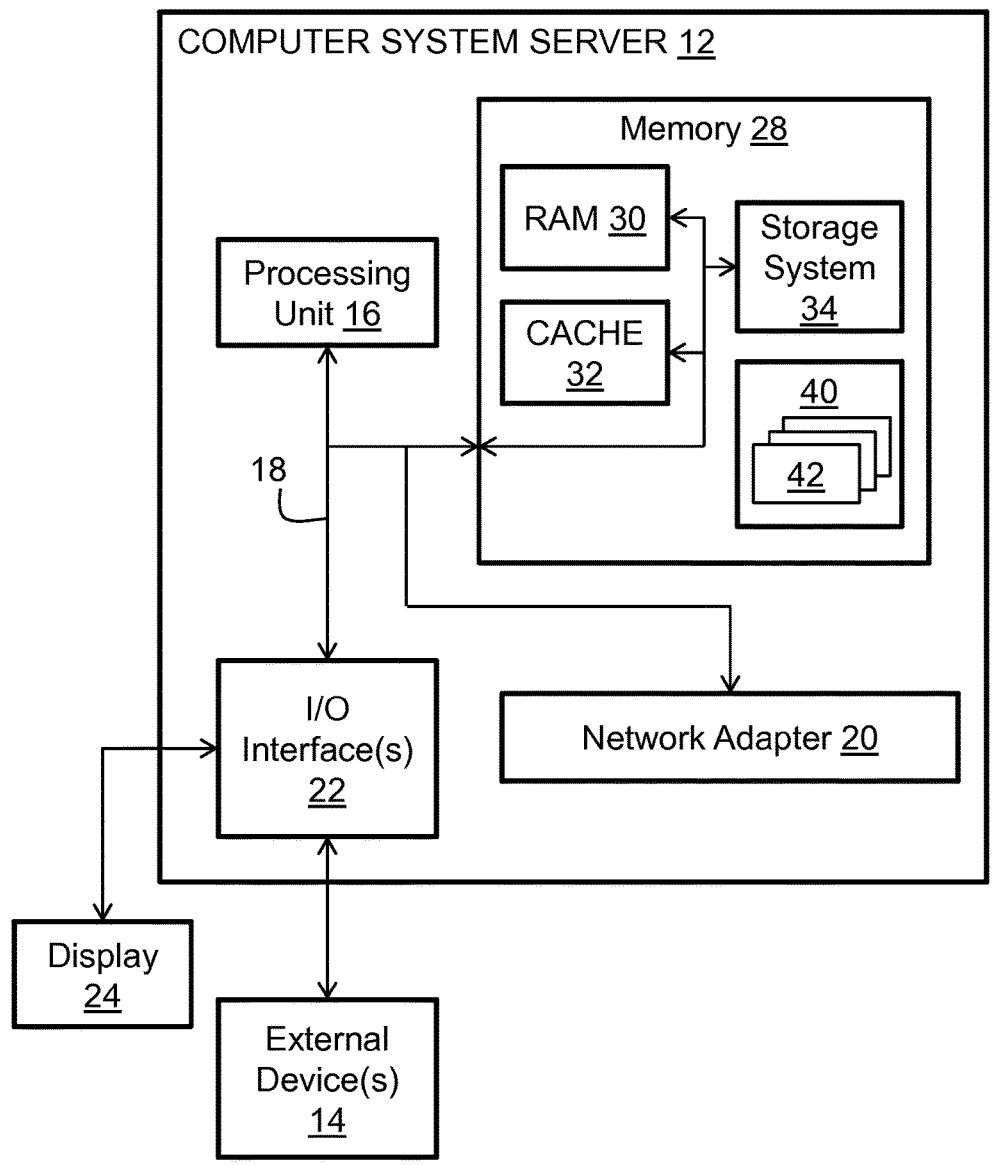
FIG. 1 shows a computer system/server that is applicable to implement the embodiments.

Referring now to FIG. 1, in which an exemplary computer system/server 12 which is applicable to implement the embodiments is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disk-read only memory (CD-ROM), digital versatile disc (DVD-ROM) or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
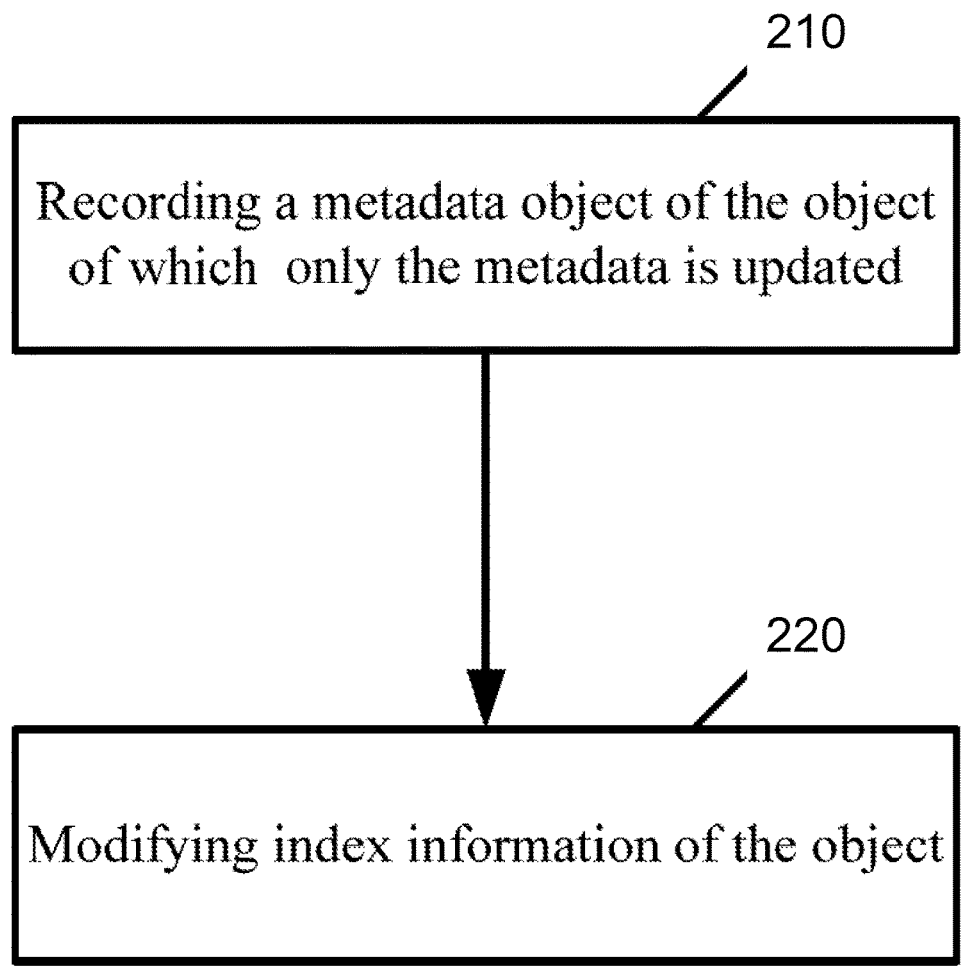
FIG. 2 is a process flow for object storage according to an embodiment.

FIG. 2 shows a process flow 200 for object storage according to an embodiment. With reference now to FIG. 2, this embodiment will be described.

The process flow 200 according to this embodiment can be applied to the case where metadata of the object is changed (updated) in the object storage.

As described above, in the object storage, the data of the object and metadata indicating the property set of the object can be stored together. In the case that the data storage is implemented using the log structured data store, a log structured store data file can be created to store the respective objects therein. The log structured store data file can be saved in a certain storage region with a large size in a disk of an object storage device, and the storage region can be referred to herein as object storage region". In the log structured store data file, the objects are stored sequentially, and the newly created object is appended at the end of the file. The object can include three parts: a head, a data portion, and a padding portion. The head may include the metadata of the object. Usually the metadata of the object can be divided into system metadata and user-defined metadata. The system metadata, for example, may include key length, data length, keyword, checksum, timestamp, partition number, etc. The user-defined metadata, for example, may include name of the object, creation time, owner, creator, size, etc. Generally, the user-defined metadata can be changed.

To facilitate retrieval of the object in the log structured store data file, for example, a memory index can be established. The memory index can use a hash value of keyword as an index value. In the memory index hash table, the hash value of the keyword is used as the index value, and a storage location of the object in the object storage region is recorded in association with the index value, to facilitate the retrieval of the object.

As shown in FIG. 2, at block 210, in response to (e.g., only) the metadata of the object in the object storage region being updated, a metadata object associated with the object is recorded in another storage region separated from the object storage region. In this embodiment, for a certain object in the object storage region, if only the metadata is updated, metadata update related information of the object will be stored in a different storage region (hereinafter referred to as "metadata change storage region") separated from the object storage region in the disk of the object storage device.

In one embodiment, a new log structured data file (which can be referred to as "metadata change log file") can be created to store the metadata update related information, and can be saved in the metadata change storage region of the disk of the object storage device. In the metadata change log file, the metadata object of the object is also stored sequentially.

In this embodiment, the metadata update related information can be represented by the metadata object. Specifically, the metadata object can include the updated metadata of the object and pointer information for pointing to a storage location of the object (hereinafter referred to as a "first storage location") in the object storage region. Utilizing the pointer information, the metadata object can be pointed to the associated object, to establish a correlation between the object and the metadata object.

In this embodiment, only the updated metadata are included in the metadata object. Alternatively, the updated metadata together with non-updated metadata can be included in the metadata object.

At block 220, index information associated with the object of which only the metadata is updated can be modified, so that the modified index information can indicate the metadata only update of the object and a storage location of the metadata object associated with the object (hereinafter referred to as a "second storage location") in the metadata change storage region.

As described above, the first storage location of the object in the object storage region can be recorded in the index information of the object. However, for the object of which only the metadata is updated, the first storage location of the object recorded in the index information shall be modified to the second storage location of the metadata object of the object, to facilitate the later retrieval of the updated metadata of the object.

Accordingly, in this embodiment, before the metadata of the object is updated, the index information of the object can include status information of the object and location information for indicating the first storage location associated with the object. The status information can include a first status indicating existence of the object, a second status indicating deletion of the object, and a third status indicating metadata only update of the object. Therefore, when only the metadata of the object is updated, the status information of the object will be modified from the first status to the third status to indicate the metadata only update of the object, and the location information will be modified from the first storage location of the object to the second storage location of the metadata object. Further, when the object is deleted from the object storage region, the status information thereof will be modified from the first status to the second status, and the location information can be deleted or maintained accordingly.

In this embodiment, the first storage location and the second storage location can be represented by a start address and a length. The start address can be an absolute address or an offset with respect to a reference location. Thus, the first storage location can be represented as the original start address of the object in the object storage region and the original length of the object, the second storage location can be represented as the start address of the metadata object in the metadata change storage region and the length of the metadata object. Therefore, the pointer information can include the start address of the object and the length of the object, and the location information can include the start address of the metadata object and the length of the metadata object.

Furthermore, the index information of the object can be stored in the form of a table, e.g. a memory index table. In this case, the index information of each object constitutes an entry of the index table, and the entry can be indexed using the index value identifying the object, such as an identifier of the object and a hash value of a keyword. In this embodiment, the index table is stored in the memory of the object storage device.

While the embodiment described above relates to the log-structured object store, those skilled in the art will know that this embodiment can also be applicable to other object storage mechanism capable of processing objects with small size, as long as the objects can be stored sequentially in the object storage mechanism.

It can be seen from the above description that embodiments herein can separately store the updated metadata by storing the metadata update related information of the object of that only the metadata is updated in the metadata change storage region separated from the object storage region of the disk and modifying the corresponding index information of the object. Compared to contemporary implementations, it is not necessary to delete the original object, and thus embodiments herein can effectively save the I/O operation and storage space of the disk, resulting in a better performance of the object storage.

In addition, to release the free space in the object storage region resulting from the deletion of the object, the object storage region can be periodically compacted, i.e. the objects in the object storage region can be rearranged. In one embodiment, in response to a request for compacting the object storage region, the metadata in the metadata objects stored in the metadata change storage region is used to replace the corresponding metadata of the corresponding objects stored in the object storage region, so that these objects have the updated metadata. Then, a compaction operation is performed on the object storage region, and the index information of the objects is modified. The storage locations of the objects in the object storage region can be changed due to the compaction operation, so it is necessary to modify the index information of the objects accordingly.

Figure 3:
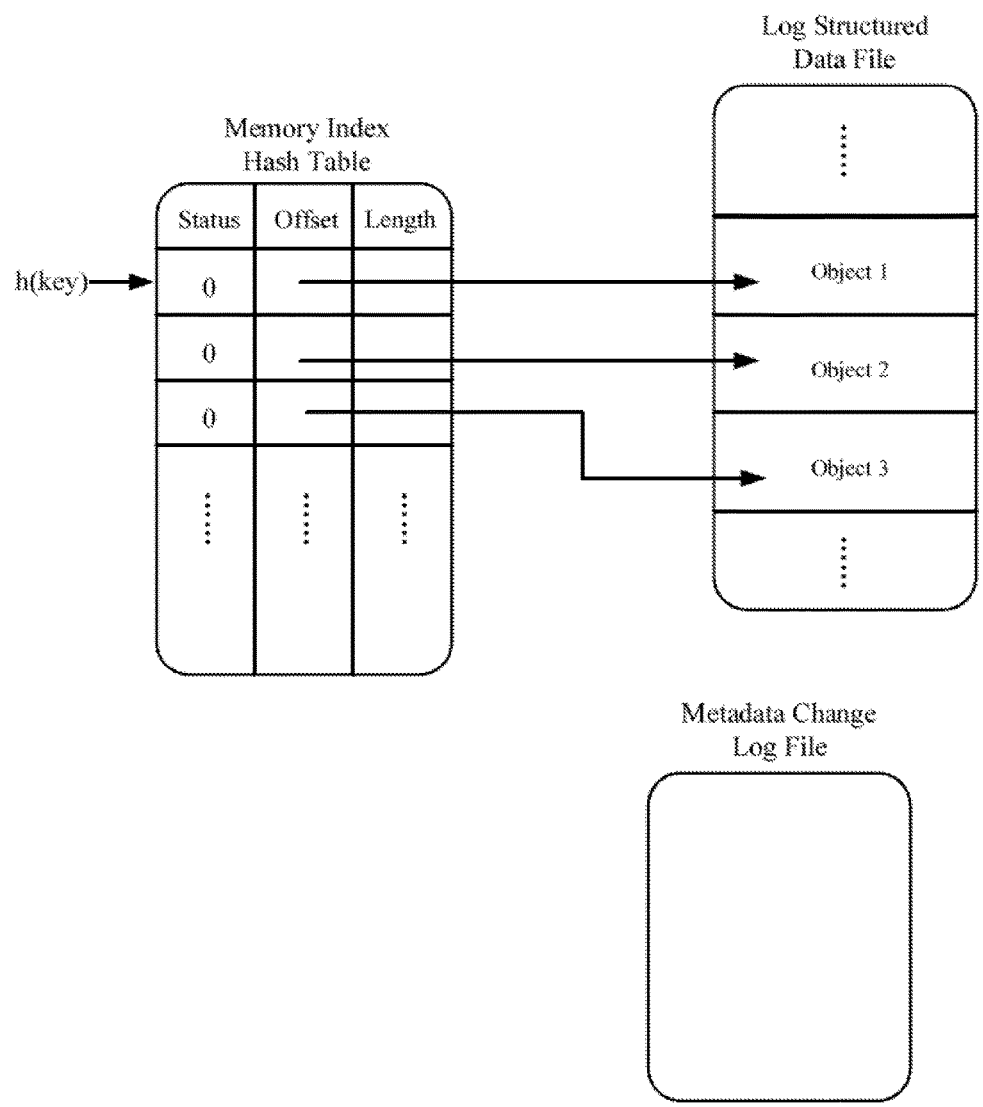
FIG. 3 is a schematic diagram for object storage according to an embodiment.
Figure 4:
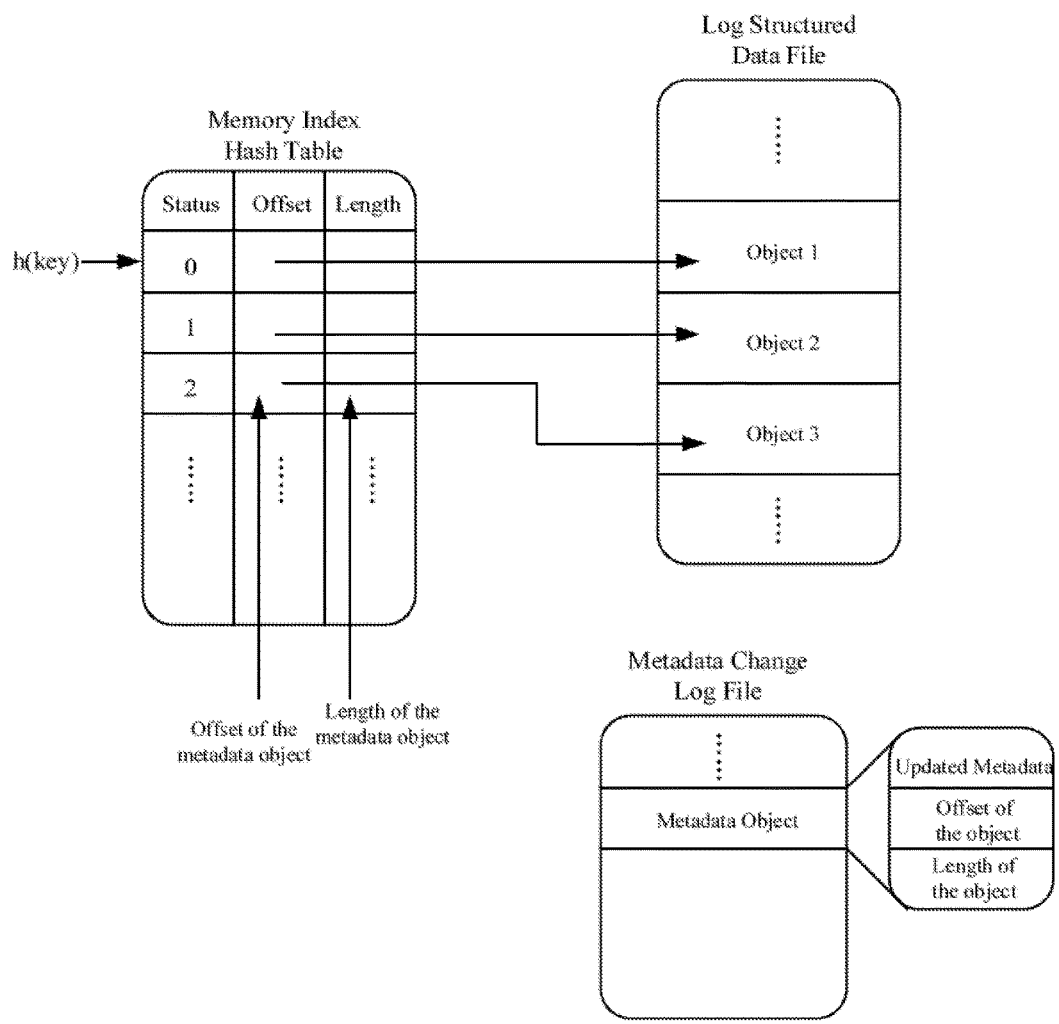
FIG. 4 is a schematic diagram for object storage according to an embodiment.

FIGS. 3-4 illustrate schematic diagram for object storage according to embodiments, such as the embodiment described in FIG. 2, wherein FIG. 3 shows the situation of object storage before update, and FIG. 4 shows the situation of object storage after the update. As shown in FIGS. 3-4, in this example, the object is stored in the log structured data file on the disk, the index information of the object is stored in the memory index hash table, and the metadata object is stored in the metadata change log file on the disk. To facilitate illustration, assumed that there are three objects 1, 2 and 3 stored in the log structured data file. In FIGS. 3-4, in the memory index hash table, the values of the status information (indicated by the "Status") of the three objects are all "0", which indicates that the objects exist in the log structured data file. "Offset" and "Length" in the memory index hash table indicate the storage locations of the objects 1, 2 and 3 in the log structured data file. At this time, the metadata change log file does not record any metadata object. If object 2 is deleted and only the metadata of object 3 is changed, in the log structured data file, object 2 is deleted and objects 1 and 3 are maintained. At this time, in the metadata change log file, the new metadata object is recorded, which is associated with object 3 and includes the updated metadata of object 3 and the pointer information pointing to the storage location of object 3 in the log structured data file. The storage location is represented by the start address (which is the offset in this example) of object 3 and the length of object 3. Further, in the memory index hash table, the value of the status information of object 2 is modified to "1", which indicates that object 2 has been deleted from the log structured data file, and the status information of object 3 is modified to "2", which indicates that only the metadata is changed. In addition, in the memory index hash table, the location information of object 3 is also modified to point to the metadata object in the metadata change log file, i.e., the storage location of the metadata object in the metadata change log file, which can be represented by the start address (which is the offset in this example) of the metadata object and the length of the metadata object.

Figure 5:
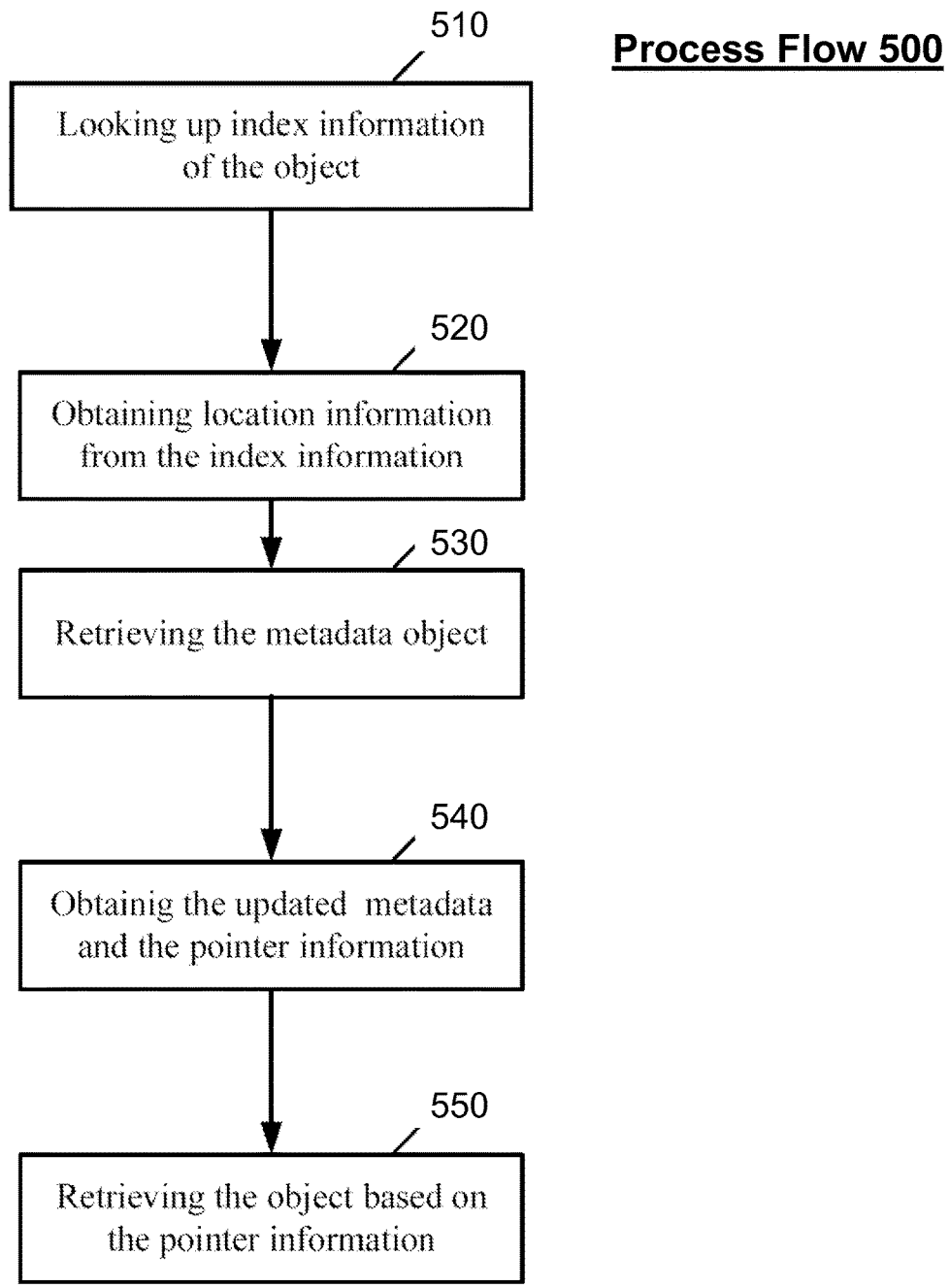
FIG. 5 is a process flow for retrieving an object in an object storage device according to an embodiment.

FIG. 5 is a process flow 500 for retrieving an object in an object storage device according to an embodiment. Hereinafter, this embodiment is described in detail in conjunction with the accompanying drawing, wherein the description for the parts related to those of the previous embodiments is appropriately omitted.

In the process flow 500, the object storage device stores the object using the method for object storage according to the embodiment shown in FIG. 2.

As shown in FIG. 5, at block 510, in response to a request for retrieving the object, the index information associated with the object requested is looked up. Generally, the request for retrieving the object can include information for identifying the object, such as the identifier of the object and a keyword. Based on such identification information, the relevant index information can be obtained.

As described above, the index information of the object includes the status information and the location information. If the status information in the index information indicates that only the metadata of the object is update, at block 520, the location information of the object is obtained from the index information. In this case, the location information indicates the storage location of the metadata object associated with the object in the metadata change storage region. If the status information indicates that the object exists, the location information of the object indicates the storage location of the object in the object storage region. If the status information indicates that the object is deleted, the object will be ignored.

At block 530, the metadata object is retrieved based on the obtained storage location of the metadata object. As described above, the storage location of the metadata object can be represented by the start address and the length. In the case where the start address indicates an absolute address, the metadata object can be obtained within an address range from the start address to (the start address+the length). In the case where the start address indicates an offset with respect to the reference location, the metadata object can be obtained within an address range from (the reference location+the offset) to (the reference location+the offset+the length).

As described above, the metadata object can include the updated metadata of the object and the pointer information pointing to the storage location of the object in the object storage region. Thus, at block 540, the updated metadata and the pointer information of the object are obtained from the retrieved metadata object. At block 550, based on the pointer information, the corresponding object is retrieved. As described above, the pointer information can include the start address of the object and the length of the object. In the case where the start address indicates the absolute address, the object can be obtained within an address range from the start address to (the start address+the length). In the case where the start address indicates the offset with respect to the reference location, the object can be obtained within an address range from (the reference location+the offset) to (the reference location+the offset+the length).

After the updated metadata of the object and the object are obtained, the retrieved object and the updated metadata thereof are returned to a client requesting for retrieval of the object. Further, the original metadata can be replaced with the updated metadata, and then the object having the updated metadata can be provided.

It can be seen from the above description that the method for retrieving an object in an object storage device according to the present embodiment can effectively identify the object of which only metadata is updated, and implement the retrieval of the object.

In the example of FIGS. 3-4, upon receipt of the request for retrieving object 3, the corresponding index entry is looked up in the memory index hash table. The value of the status information in the index entry is "2", which indicates that object 3 is the object of which only the metadata is updated, so the "Offset" and the "Length" in the index entry indicate the storage location of the metadata object of object 3. Based on the "Offset" and the "Length", the metadata object of object 3 can be retrieved in the metadata change log file, and the updated metadata and the pointer information pointing to the storage location of object 3 are then obtained from the metadata object. Then, based on the pointer information, object 3 can be retrieved in the log structured data file.

Figure 6:
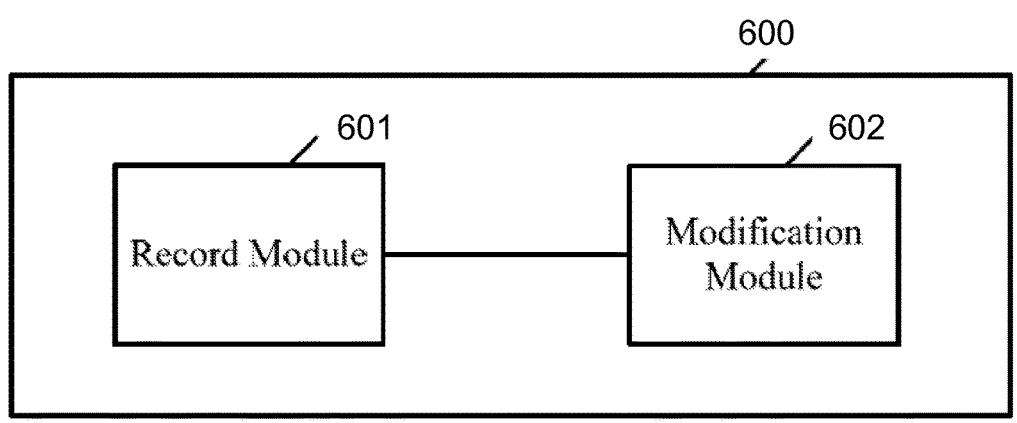
FIG. 6 is a schematic block diagram of the apparatus for object storage according to an embodiment.

In view of the above, FIG. 6 is a schematic block diagram of the apparatus 600 for object storage according to an embodiment. Hereinafter, this embodiment is described in detail in conjunction with the accompanying drawing, wherein the description for the parts related to those of the previous embodiments is appropriately omitted.

As shown in FIG. 6, the apparatus 600 for object storage according to this embodiment can comprise: a record module 601 configured to, in response to only the metadata of the object in the object storage region being updated, record the metadata object associated with the object in the metadata change storage region separated from the object storage region, and a modification module 602 configured to modify the index information associated with the object, such that the modified index information indicates the metadata only update of the object and a second storage location representing a storage location of the metadata object in the metadata change storage region.

In the apparatus 600 according to this embodiment, when only metadata of a certain object in the object storage region is updated, the record module 601 stores the metadata object of the object in the metadata change storage region different from the object storage region. The metadata object indicates the metadata update related information which includes the updated metadata of the object and the pointer information, wherein the pointer information points to the first storage location representing the storage location of the object in the object storage region.

In one embodiment, the object storage region employs the log structured data store to implement the object storage. Accordingly, the metadata change storage region also employs the log structured data store.

In this embodiment, only the updated metadata are included in the metadata object. Alternatively, the updated metadata together with the non-updated metadata are included in the metadata object.

Next, the modification module 602 modifies the index information of the object of which only the metadata is updated. As described above, before the metadata of the object is updated, the index information can include the status information of the object and the location information for indicating the first storage location of the object. In this embodiment, the status information of the object can include a first status indicating existence of the object, a second status indicating deletion of the object, and a third status indicating metadata only update of the object. For the object of which only the metadata is updated, the modification module 502 modifies the status information in the index information from the first status to the third status, and modifies the location information to indicate the second storage location.

In one embodiment, the first storage location and the second storage location can be represented by the start address and the length. The start address can be an absolute address or an offset with respect to a reference location.

Further, the apparatus 600 according to this embodiment can further comprise replacement module, which is configured to, in response to a request for compacting the object storage region, replace the metadata of the objects stored in the object storage region with the updated metadata in the metadata objects stored in the metadata change storage region, and a compaction module, which is configured to perform a compaction operation on the object storage region. In this case, the modification module 601 is further configured to modify the index information of the objects in the object storage region.

It should be noted that the apparatus 600 according to this embodiment can operatively implement the method for object storage according to the embodiment shown in FIG. 2.

Figure 7:
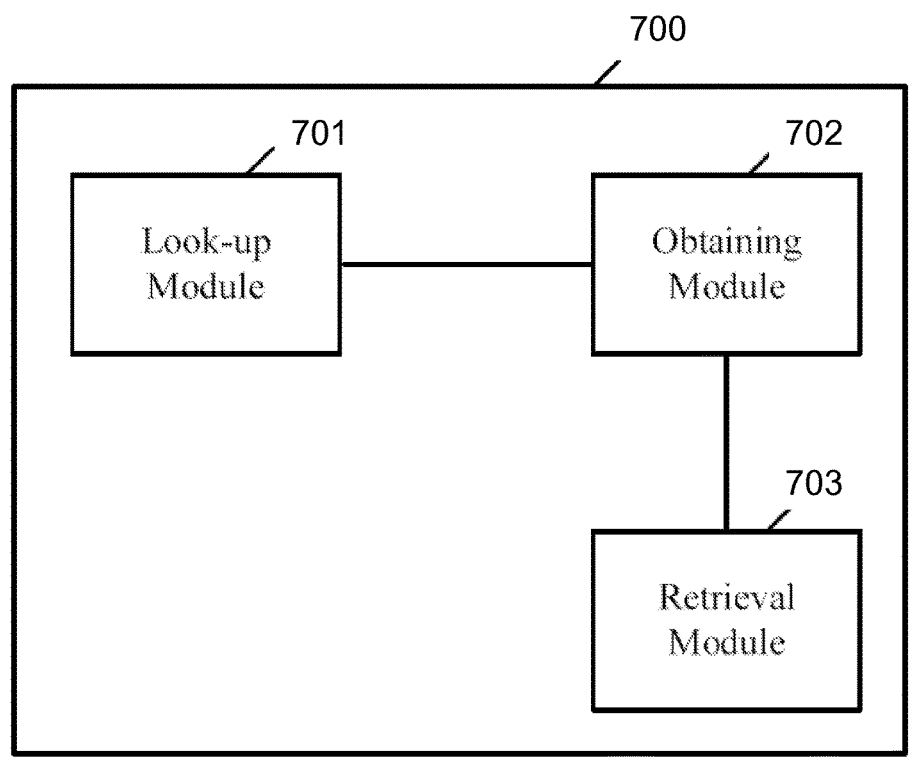
FIG. 7 is a schematic block diagram of the apparatus for retrieving an object in an object storage device according to an embodiment.

FIG. 7 shows a schematic block diagram of the apparatus 700 for retrieving an object in an object storage device according to an embodiment. Hereinafter, this embodiment is described in detail in conjunction with the accompanying drawing, wherein the description for the parts related to those of the previous embodiments is appropriately omitted.

The apparatus 700 according to this embodiment is applicable to the object storage device which stores the objects using the apparatus 600 for object storage as shown in FIG. 6.

As shown in FIG. 7, the apparatus 700 according to this embodiment can comprise: a look-up module 701 configured to, in response to a request for retrieving the object, look up index information associated with the requested object; an obtaining module 702 configured to, in response to the index information indicating that the metadata only update of the object, obtain from the index information the storage location of the metadata object associated with the object; and a retrieval module 703 configured to retrieve the metadata object based on the obtained storage location of the metadata object. In addition, the obtaining module 702 is further configured to obtain from the retrieved metadata object the updated metadata of the object and the pointer information pointing to the storage location of the object. The retrieval module 703 is further configured to retrieve the object based on the pointer information.

Further, the apparatus 700 according to this embodiment can further include a replacement module, which is configured to replace the metadata of the retrieved object with the updated metadata of the object.

It should be noted that the apparatus 700 according to this embodiment can operatively implement the method for retrieving an object in an object storage device according to the embodiment shown in FIG. 5.

In view of the above, embodiments herein include a method for object storage. The method comprising, in response to only metadata of an object in an object storage region being updated, recording a metadata object associated with the object in a metadata change storage region separated from the object storage region, the metadata object including updated metadata of the object and pointer information for pointing to a first storage location representing a storage location of the object in the object storage region; and modifying index information associated with the object, such that the modified index information indicates the metadata only update of the object and a second storage location representing a storage location of the metadata object in the metadata change storage region.

In another embodiment or according to the method embodiment above, the object storage region can employ a log structured data store to implement the object storage.

In another embodiment or according to any of the method embodiments above, the index information can include status information of the object and location information for indicating the first storage location, the status information including a first status indicating existence of the object, a second status indicating deletion of the object, and a third status indicating metadata only update of the object.

In another embodiment or according to any of the method embodiments above, the updated metadata of the object can be included in the metadata object together with non-updated metadata of the object.

In another embodiment or according to any of the method embodiments above, the first storage location and the second storage location can be represented by a start address and a length.

In another embodiment or according to any of the method embodiments above, the method can comprise, in response to a request for compacting the object storage region, replacing the metadata of the object stored in the object storage region with the updated metadata in the metadata object stored in the metadata change storage region; performing a compaction operation on the object storage region; and modifying the index information of the object in the object storage region.

In another embodiment or according to any of the method embodiments above, the object storage region and the metadata change storage region can be on a disk of an object storage device, and the index information can be stored in a memory of the object storage device.

In another embodiment, a method is provided that includes retrieving an object in an object storage device, where the object storage device stores the object using according to any of the method embodiments above. The method for retrieving can comprise, in response to a request for retrieving the object, looking up index information associated with the object; in response to the index information indicating metadata only update of the object, obtaining, from the index information, a storage location of a metadata object associated with the object; retrieving the metadata object based on the obtained storage location of the metadata object; obtaining, from the metadata object, the updated metadata of the object and pointer information for pointing to a storage location of the object; and retrieving the object based on the pointer information.

In another embodiment or according to any of the method embodiments above, the method can comprise replacing the metadata of the retrieved object with the updated metadata of the object.

In view of the above, embodiments herein also include an apparatus for object storage. The apparatus comprises a record module configured to, in response to only metadata of the object storage region being updated, record a metadata object associated with the object in a metadata change storage region separated from the object storage region, the metadata object including updated metadata of the object and pointer information for pointing to a first storage location representing a storage location of the object in the object storage region; and a modification module configured to modify index information associated with the object, such that the modified index information indicates the metadata only update of the object and a second storage location representing a storage location of the metadata object in the metadata change storage region.

In another embodiment or according to the apparatus embodiment above, the object storage region employs a log structured data store to implement the object storage.

In another embodiment or according to any of the apparatus embodiments above, the index information can include status information of the object and location information for indicating the first storage location, the status information including a first status indicating existence of the object, a second status indicating deletion of the object, and a third status indicating metadata only update of the object.

In another embodiment or according to any of the apparatus embodiments above, the updated metadata of the object can be included in the metadata object together with non-updated metadata of the object.

In another embodiment or according to any of the apparatus embodiments above, the first storage location and the second storage location can be represented by a start address and a length.

In another embodiment or according to any of the apparatus embodiments above, the apparatus can comprise a replacement module configured to, in response to a request for compacting the object storage region, replace the metadata of the object stored in the object storage region with the updated metadata in the metadata object stored in the metadata change storage region; and a compaction module configured to perform a compaction operation on the object storage region; wherein the modification module is further configured to modify the index information of the object in the object storage region.

In another embodiment or according to any of the apparatus embodiments above, the object storage region and the metadata change storage region are on a disk of an object storage device, and the index information is stored in a memory of the object storage device.

In another embodiment, an apparatus for retrieving an object in an object storage device is provided, wherein the object storage device stores the object by means of an apparatus according to any of the apparatus embodiments above. The apparatus for retrieving can comprise a look-up module configured to, in response to a request for retrieving the object, look up index information associated with the object; a obtaining module configured to, in response to the index information indicating metadata only update of the object, obtain from the index information a storage location of a metadata object associated with the object; and a retrieval module configured to retrieve the metadata object based on the obtained storage location of the metadata object; wherein the obtaining module is further configured to obtain from the metadata object the updated metadata of the object and pointer information for pointing to a storage location of the object; the retrieval module is further configured to retrieve the object based on the pointer information.

In another embodiment or according to any of the apparatus embodiments above, the apparatus can comprise a replacement module configured to replace the metadata of the retrieved object with the updated metadata of the object.

Embodiments herein provide an improved method and an apparatus for object storage, and a method and an apparatus for retrieving an object in an object storage device.

According to one embodiment, there is provided a method for object storage. In the method, in response to only metadata of an object in an object storage region being updated, a metadata object associated with the object is recorded in a metadata change storage region separated from the object storage region. The metadata object includes updated metadata of the object and pointer information for pointing to a first storage location representing a storage location of the object in the object storage region. Index information associated with the object is modified, such that the modified index information indicates the metadata only update of the object and a second storage location representing a storage location of the metadata object in the metadata change storage region.

According to another aspect of the embodiments herein, there is provided a method for retrieving an object in an object storage device, wherein the object storage device stores the object by using the above-described method for object storage. In the method, in response to a request for retrieving the object, index information associated with the object is looked up. In response to the index information indicating metadata only update of the object, a storage location of a metadata object associated with the object is obtained from the index information. Based on the obtained storage location of the metadata object, the metadata object is retrieved. Then from the metadata object, the updated metadata of the object and pointer information for pointing to a storage location of the object is obtained. The object is retrieved based on the pointer information.

According to a further aspect of the embodiments, there is provided an apparatus for object storage. The apparatus comprises record module configured to, in response to only metadata of an object in the object storage region being updated, record a metadata object associated with the object in a metadata change storage region separated from the object storage region, the metadata object including updated metadata of the object and pointer information for pointing to a first storage location representing a storage location of the object in the object storage region, and modification module configured to modify index information associated with the object, such that the modified index information indicates the metadata only update of the object and a second storage location representing a storage location of the metadata object in the metadata change storage region.

According to still another embodiment, there is provided an apparatus for retrieving an object in an object storage device, wherein the object storage device stores the object by means of the above-described apparatus for object storage. The apparatus comprises look-up module configured to, in response to a request for retrieving the object, look up index information associated with the object, obtaining module configured to, in response to the index information indicating the metadata only update of the object, obtain from the index information a storage location of a metadata object associated with the object, and retrieval module configured to retrieve the metadata object based on the obtained storage location of the metadata object. The obtaining module is further configured to obtain from the metadata object the updated metadata of the object and pointer information for pointing to a storage location of the object. The retrieval module is further configured to retrieve the object based on the pointer information.

The method and apparatus for object storage according to the embodiments herein are mainly applied to the case where only the metadata of the object is changed, and does not need to copy the unchanged content of the object, so as to effectively improve efficiency of the update operation, and keep the sequential I/O operation for the object access.

The method and apparatus for retrieving an object in an object storage device according to the embodiments herein can efficiently identify the object of which only the metadata is changed, and retrieve the object.

The embodiments herein can be a system, a method, and/or a computer program product. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments herein.

Aspects of the embodiments herein are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for object storage, comprising:

in response to an update to metadata of an object in an object storage region to produce updated metadata of the object, recording, by a processor coupled to a memory, a metadata object associated with the object in a metadata change storage region separated from the object storage region, the metadata object including the updated metadata of the object and pointer information, the pointer information pointing to a first storage location representing a storage location of the object in the object storage region;

modifying, by the processor, index information associated with the object to produce modified index information indicating the update to the metadata and a second storage location representing a storage location of the metadata object in the metadata change storage region, the index information comprising status information of the object and location information indicating the first storage location, the status information comprising a first status indicating an existence of the object, a second status indicating a deletion of the object, and a third status indicating the update to the metadata of the object, in response to a request for compacting the object storage region, replacing the metadata of the object stored in the object storage region with the updated metadata in the metadata object stored in the metadata change storage region;

performing a compaction operation on the object storage region; and modifying the index information of the object in the object storage region.

2. The method according to claim 1, wherein the object storage region log structured data store utilizes a log structured data store to implement the object storage.

3. The method according to claim 1, wherein the updated metadata is included in the metadata object with non-updated metadata of the object.

4. The method according to claim 1, wherein the first storage location and the second storage location are represented by a start address and a length.

5. The method according to claim 1, wherein the object storage region and the metadata change storage region are on a disk of an object storage device, and the index information is stored in a memory of the object storage device.

6. A computer program product, the computer program product comprising a computer readable storage medium having program instructions for object storage embodied therewith, the program instructions executable by a processor to cause the processor to perform:

in response to an update to metadata of an object in an object storage region to produce updated metadata of the object, recording a metadata object associated with the object in a metadata change storage region separated from the object storage region, the metadata object including the updated metadata of the object and pointer information, the pointer information pointing to a first storage location representing a storage location of the object in the object storage region;

modifying index information associated with the object to produce modified index information indicating the update to the metadata and a second storage location representing a storage location of the metadata object in the metadata change storage region, the index information comprising status information of the object and location information indicating the first storage location, the status information comprising a first status indicating an existence of the object, a second status indicating a deletion of the object, and a third status indicating the update to the metadata of the object, in response to a request for compacting the object storage region, replacing the metadata of the object stored in the object storage region with the updated metadata in the metadata object stored in the metadata change storage region;

performing a compaction operation on the object storage region; and modifying the index information of the object in the object storage region.

7. The computer program product according to claim 6, wherein the object storage region log structured data store utilizes a log structured data store to implement the object storage.

8. The computer program product according to claim 6, wherein the updated metadata is included in the metadata object with non-updated metadata of the object.

9. The computer program product according to claim 6, wherein the first storage location and the second storage location are represented by a start address and a length.

10. The computer program product according to claim 6, wherein the object storage region and the metadata change storage region are on a disk of an object storage device, and the index information is stored in a memory of the object storage device.

11. An apparatus comprising a processor and a computer readable storage medium having program instructions for object storage embodied therewith, the program instructions executable by the processor, the apparatus comprising"

a record module configured to, in response to an update to metadata of the object storage region to produce updated metadata of the object, record a metadata object associated with the object in a metadata change storage region separated from the object storage region, the metadata object including the updated metadata of the object and pointer information, the pointer information pointing to a first storage location representing a storage location of the object in the object storage region; and a modification module configured to modify index information associated with the object to produce modified index information indicating the update to the metadata and a second storage location representing a storage location of the metadata object in the metadata change storage region, the index information comprising status information of the object and location information indicating the first storage location, the status information comprising a first status indicating an existence of the object, a second status indicating a deletion of the object, and a third status indicating the update to the metadata of the object, a replacement module configured to, in response to a request for compacting the object storage region, replace the metadata of the object stored in the object storage region with the updated metadata in the metadata object stored in the metadata change storage region; and a compaction module configured to perform a compaction operation on the object storage region;

wherein the modification module is further configured to modify the index information of the object in the object storage region.

12. The apparatus according to claim 11, wherein the object storage region utilizes a log structured data store log structured data store to implement the object storage.

13. The apparatus according to claim 11, wherein the updated metadata is included in the metadata object with non-updated metadata of the object.

14. The apparatus according to claim 11, wherein the first storage location and the second storage location are represented by a start address and a length.

* * * * *